United States Patent
Lee et al.

(10) Patent No.: US 8,212,867 B2
(45) Date of Patent: Jul. 3, 2012

(54) UNDERWATER CCD CAMERA FOR VISUAL TESTING OF REACTOR COOLING SYSTEM

(75) Inventors: Hee Jong Lee, Daejeon (KR); Byung Sik Yoon, Daejeon (KR); Sung Nam Choi, Daejeon (KR); Min Woo Nam, Daejeon (KR)

(73) Assignee: Korea Hydro & Nuclear Power Co., Ltd., Seoul (KR)

( * ) Notice: Subject to any disclaimer, the term of this patent is extended or adjusted under 35 U.S.C. 154(b) by 533 days.

(21) Appl. No.: 12/562,966

(22) Filed: Sep. 18, 2009

(65) Prior Publication Data
US 2010/0328448 A1 Dec. 30, 2010

(30) Foreign Application Priority Data
Jun. 30, 2009 (KR) .................. 10-2009-0059459

(51) Int. Cl.
*H04N 7/18* (2006.01)
(52) U.S. Cl. ........................................................ 348/81
(58) Field of Classification Search ............... 348/81
See application file for complete search history.

(56) References Cited

U.S. PATENT DOCUMENTS

| | | | | |
|---|---|---|---|---|
| 4,857,261 | A * | 8/1989 | Marshall et al. | 376/248 |
| 5,604,532 | A * | 2/1997 | Tillmanns | 348/84 |
| 6,639,959 | B1 * | 10/2003 | Capobianco et al. | 376/248 |
| 2011/0182393 | A1 * | 7/2011 | Hequet et al. | 376/248 |

* cited by examiner

*Primary Examiner* — Larry Donaghue
(74) *Attorney, Agent, or Firm* — Edwards Wildman Palmer LLP

(57) ABSTRACT

Disclosed is an underwater CCD camera for visual testing of a reactor cooling system. The underwater CCD camera includes a CCD camera, a casing having a supporter supporting the CCD camera and a cooling pin on a top surface thereof, a Pb-glass window on a front side of the easing to shield the CCD camera from radiation and to reduce a temperature difference between the interior and exterior of the casing, a sealing O-ring preventing a coolant from being introduced into a gap between the Pb-glass window and the casing, a sealing nut providing a fastening force to bring the Pb-glass window into close contact with the sealing O-ring, a rear cap, a silicon O-ring preventing the coolant from being introduced into a gap between the rear cap and the casing, and a fastening nut providing a fastening force to prevent leakage between a camera cable and the casing.

7 Claims, 5 Drawing Sheets

UNDERWATER CCD CAMERA FOR VISUAL TESTING OF REACTOR COOLING SYSTEM

BACKGROUND OF THE INVENTION

1. Field of the Invention

The present invention relates to an underwater charge coupled device (CCD) camera for visual testing of a reactor cooling system. More particularly, the present invention relates to an underwater CCD camera for visual testing of a reactor cooling system, which includes a casing, a top surface of which has an area two or more times greater than that of a bottom surface thereof to generate natural convection in the casing by thermal gradient between upper and lower parts inside the casing to thereby remove heat generated by the CCD camera through natural cooling, and lead (Pb)-glass windows dually disposed on a front side of the CCD camera to protect a CCD circuit of the CCD camera from radiation exposure and formed with vent holes, through which interior air between the Pb-glass windows circulates in the casing.

2. Description of the Related Art

In nuclear power generation, energy generated by nuclear fission of nuclear fuel in a reactor heats a primary coolant, and heat of the heated primary coolant is transferred to a secondary coolant in a steam generator so that generated steam can rotate a steam turbine, thereby producing electricity through a power generator.

To test integrity of an interior structure, piping, a pressure container, a heat pipe of the steam generator, etc. constituting a reactor cooling system of a nuclear power plant, nondestructive testing is periodically performed pursuant to nuclear power regulations, the American Society of Mechanical Engineers (ASME) code, or the like.

Particularly, the interior structure of the reactor, the nuclear fuel, and a control element assembly are subjected to periodic visual testing with respect to accessible parts on an inner surface of the pressure container in accordance with requirements of test plans during long term operation of each nuclear power plant. The objective of the visual testing is to test the integrity, e.g., whether elements of the reactor cooling system are separated. whether the nuclear fuel and control element assembly are damaged, etc. and to inspect and remove foreign matter that can accumulate in the reactor.

Referring to FIG. 1, the nuclear fuel arranged in the reactor is provided in a unit of a fuel assembly 100, which includes a plurality of fuel rods 105. Each of the fuel rods 105 includes uranium pellets 120, each of which is coated with a 1 mm thick Zr-alloy cladding tube 110, no that the fuel rods 105 can be protected from external damage and to prevent radiation leaks.

Due to danger associated with radiation exposure, visual testing of the inner structures in the reactor is carried out not directly by a tester, but indirectly by a CCD camera under water. Thus, the CCD camera for indirect visual testing must he operated under radiation exposure and in water having a temperature of about 30-37° C.

In a conventional underwater CCD camera for visual testing of the fuel assembly 100 in the reactor cooling system, a camera casing suffers a temperature increase up to about 70° C. by heat generated from the CCD camera when the CCD camera is operated in the coolant, so that a CCD circuit can be damaged by the heat. Accordingly, for normal operation of the CCD camera, it is necessary to lower the temperature of the casing. Further, to secure quality of digital images by preventing noise relating to radiation exposure, it is necessary to shield the CCD circuit of the CCD camera from radiation exposure.

SUMMARY OF THE INVENTION

The present invention is directed to solving the above and other problems of the related art, and an aspect of the invention is to provide an underwater charge coupled device (CCD) camera for visual testing of a reactor cooling system, which includes a casing, a top surface of which has an area two or more times greater than that of a bottom surface thereof to generate natural convection in the casing by thermal gradient between upper and lower parts inside the casing to thereby remove heat generated by the CCD camera through natural cooling.

Another aspect of the invention is to provide an underwater charge coupled device (CCD) camera for visual testing of a reactor cooling system, which includes Pb-glass windows dually disposed on a front side of the CCD camera to protect a CCD circuit of the CCD camera from radiation exposure and formed with vent holes, through which interior air between the Pb-glass windows circulates in the casing.

In accordance with an aspect, the invention provides an underwater charge coupled device (CCD) camera for visual testing of a reactor cooling system including: a CCD camera; a casing having a supporter therein to support the CCD camera and a cooling pin on atop surface of the casing; a Pb-glass window installed on a front side of the casing to shield the CCD camera from radiation and to reduce a temperature difference between the interior and exterior of the casing; a sealing O-ring preventing a coolant from being introduced into a gap between the Pb-glass window and the casing; a scaling nut providing a fastening force to bring the Pb-glass window into close contact with the sealing O-ring such that the Pb-glass window is sealed by the sealing O-ring; a rear cap disposed at the rear of the casing; a silicon O-ring preventing the coolant from being introduced into a gap between the rear cap and the casing; and a fastening nut providing a fastening force to prevent leakage between a camera cable and the casing.

The Pb-glass window may include a front Pb-glass window and a rear Pb-glass window.

The underwater CCD camera may further include a silicon spacer interposed between the front Pb-glass window and the rear Pb-glass window.

The rear Pb-glass window may be formed at upper and lower sides thereof with vent holes.

The vent holes may include two vent holes formed at the upper side a holes formed at the lower side.

The underwater CCD camera may further include washers between the sealing nut and the front Pb-glass window and between the silicon spacer and the rear Pb-glass window.

The washers may include Teflon washers.

BRIEF DESCRIPTION OF THE DRAWINGS

The above and other aspects, features and advantages of the invention will become apparent from the following description of exemplary embodiments given in conjunction with the accompanying drawings, in which.

DETAILED DESCRIPTION OF THE EMBODIMENT

Exemplary embodiments of the invention will be described with reference to accompanying drawings in sufficient detail as to be easily implemented h a person having ordinary knowledge in the art. The above and other aspects, features, operation and advantageous effect of the invention will be further apparent by the embodiments.

The embodiments disclosed herein are given by way of illustration only and many other embodiments may easily be made by those skilled in the art. Accordingly, the spirit and scope of the invention are not limited or restricted by the following embodiments, and various modifications, additions, and equivalents thereof can be made without departing from the spirit and scope of the invention.

Figure 1:
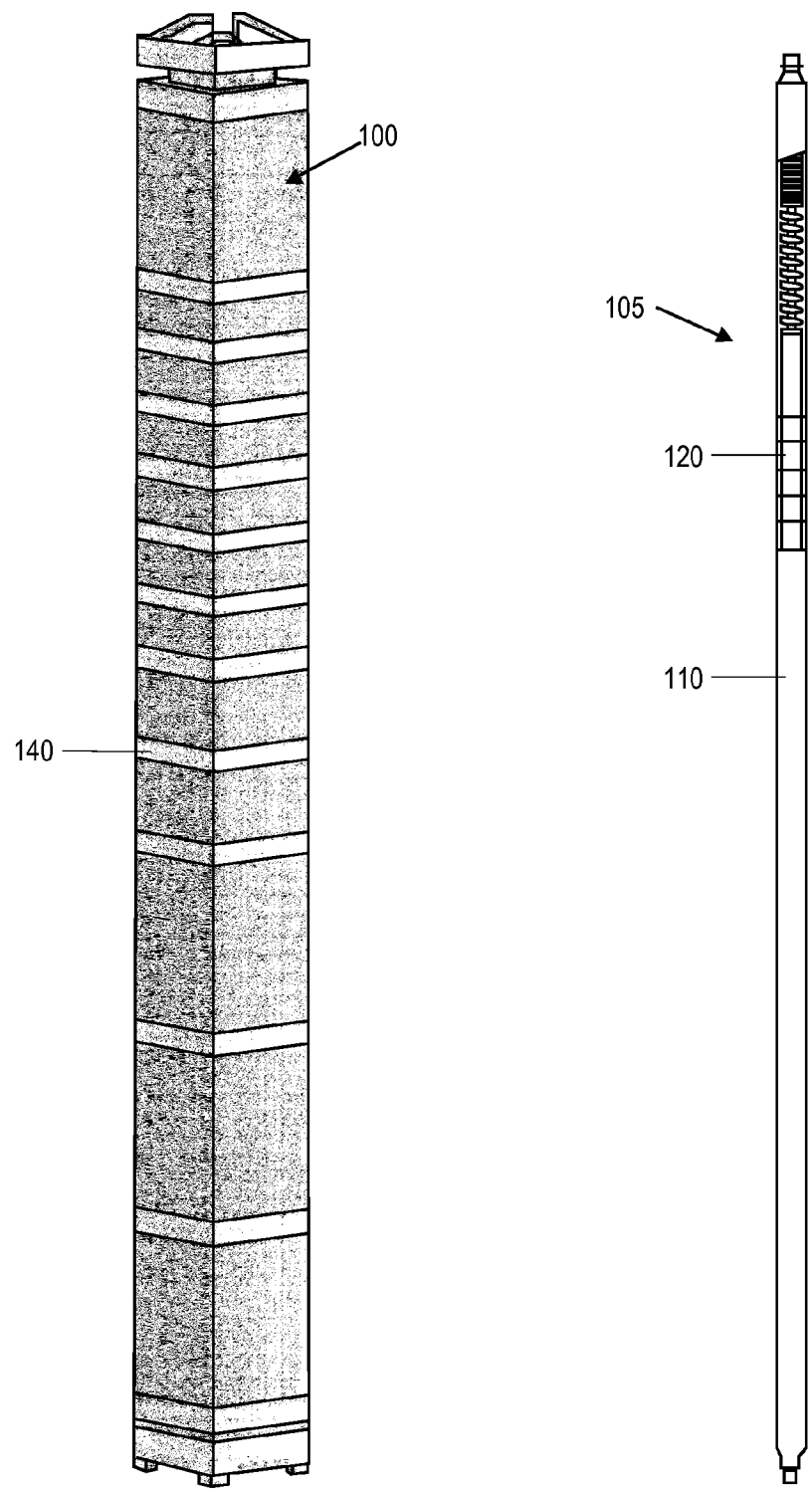
FIG. 1 is a configuration view or a conventional fuel assembly and a fuel rod.
Figure 2:
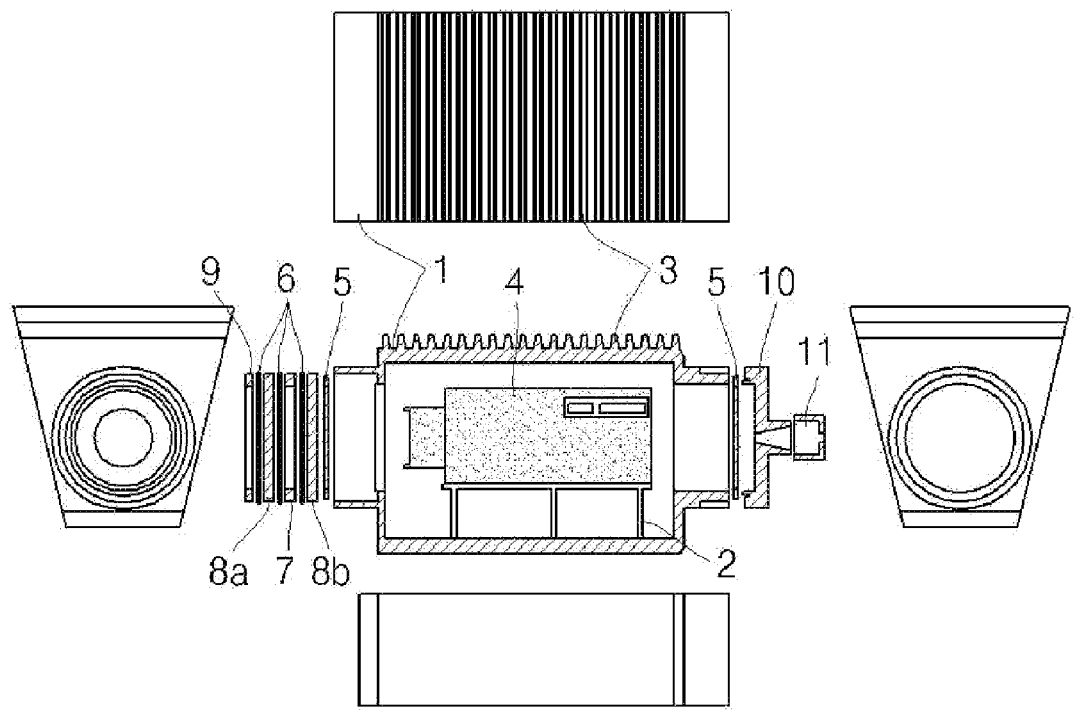
FIG. 2 is a configuration view of an underwater CCD camera for visual testing of a reactor cooling system according to an embodiment of the present invention.
Figure 3:
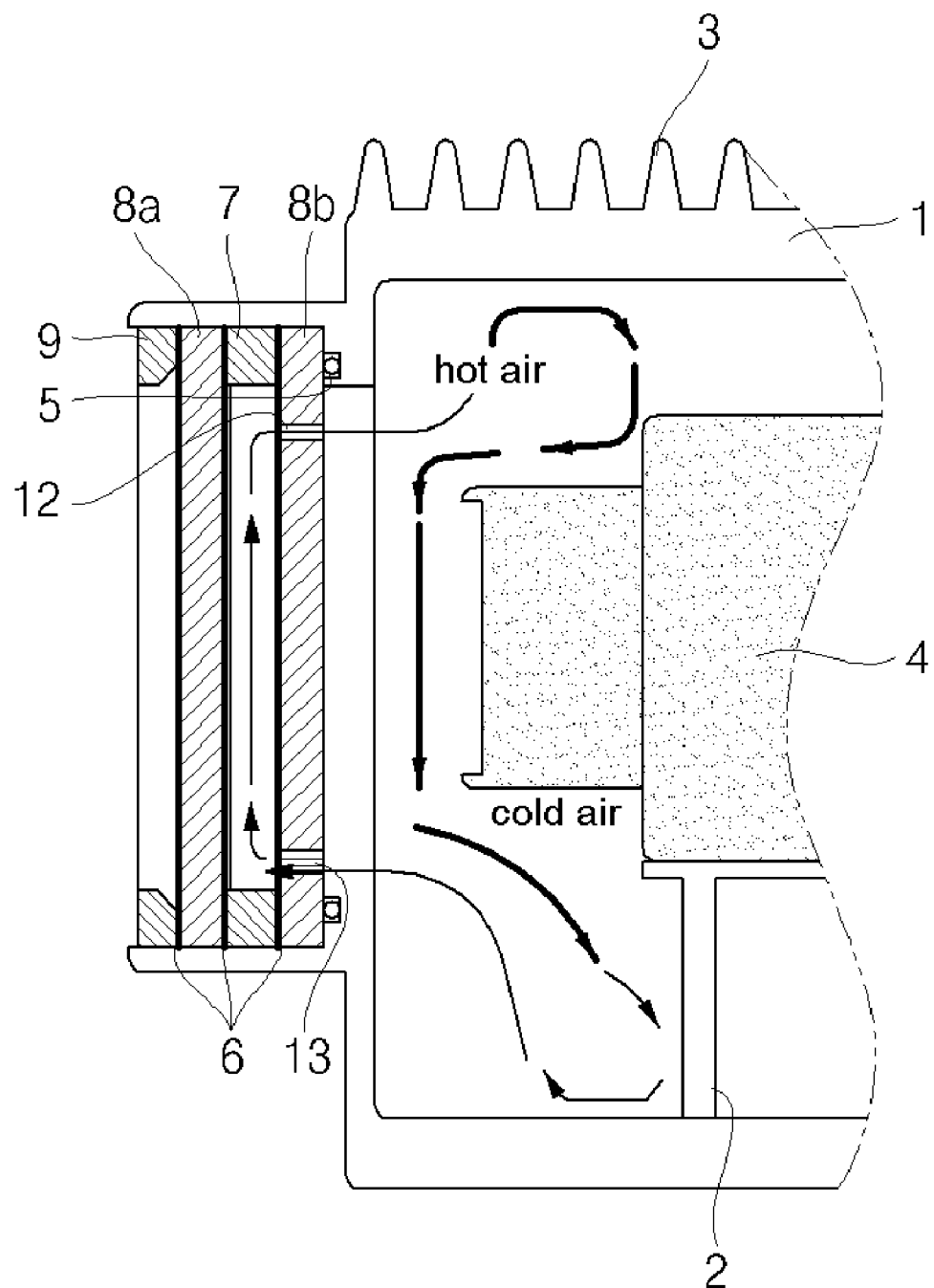
FIG. 3 is a side view of a major part of the underwater CCD camera according to the embodiment of the present invention.

FIG. 2 is a configuration view of an underwater CCD camera for visual testing of a reactor cooling system according to an embodiment of the present invention, and FIG. 3 is a side view of a major part of the underwater CCD camera according to the embodiment of the present invention Referring to FIGS. 2 and 3, an underwater CCD camera according to one embodiment of the invention includes: a CCD camera 4; a casing 1 having a supporter 2 therein to support the CCD camera 4 and a cooling pin 3 on a top surface of the casing 1; front and rear Pb-glass windows 8a and 8b disposed on a front side of the casing 1 to shield the CCD camera 4 from radiation and to reduce a temperature difference between the interior and the exterior of the casing 1, a sealing O-ring 5 preventing a coolant from being introduced into a gap between the rear Pb-glass window 8b and the easing 1, a silicon spacer 7 providing a space between the front Pb-glass window 8a and the rear Pb-glass window 8b, a sealing nut 9 providing a fastening force to bring the front and rear Pb-glass windows 8a, 8b into close contact with the sealing O-ring 5 such that the front and rear Pb-glass windows 8a, 8b are sealed by the sealing O-ring 5, a rear cap 10 disposed at the rear of the casing 1, a silicon O-ring 15 preventing a coolant from being introduced into a gap between the rear cap 10 and the casing 1, and a fastening nut 11 providing a fastening force to prevent leakage between a camera cable (not shown) and the casing 1.

The top surface of the casing 1 has an area about two times greater than that of the bottom surface thereof.

The cooling pins 3 on the top surface serve to dissipate heat generated from the CCD camera 4 inside the casing 1.

Further, Teflon washers 6 are provided between the sealing nut 9 and the front Pb-glass window 8a and between the silicon spacer 7 and the rear Pb-glass window 8b.

Figure 4:
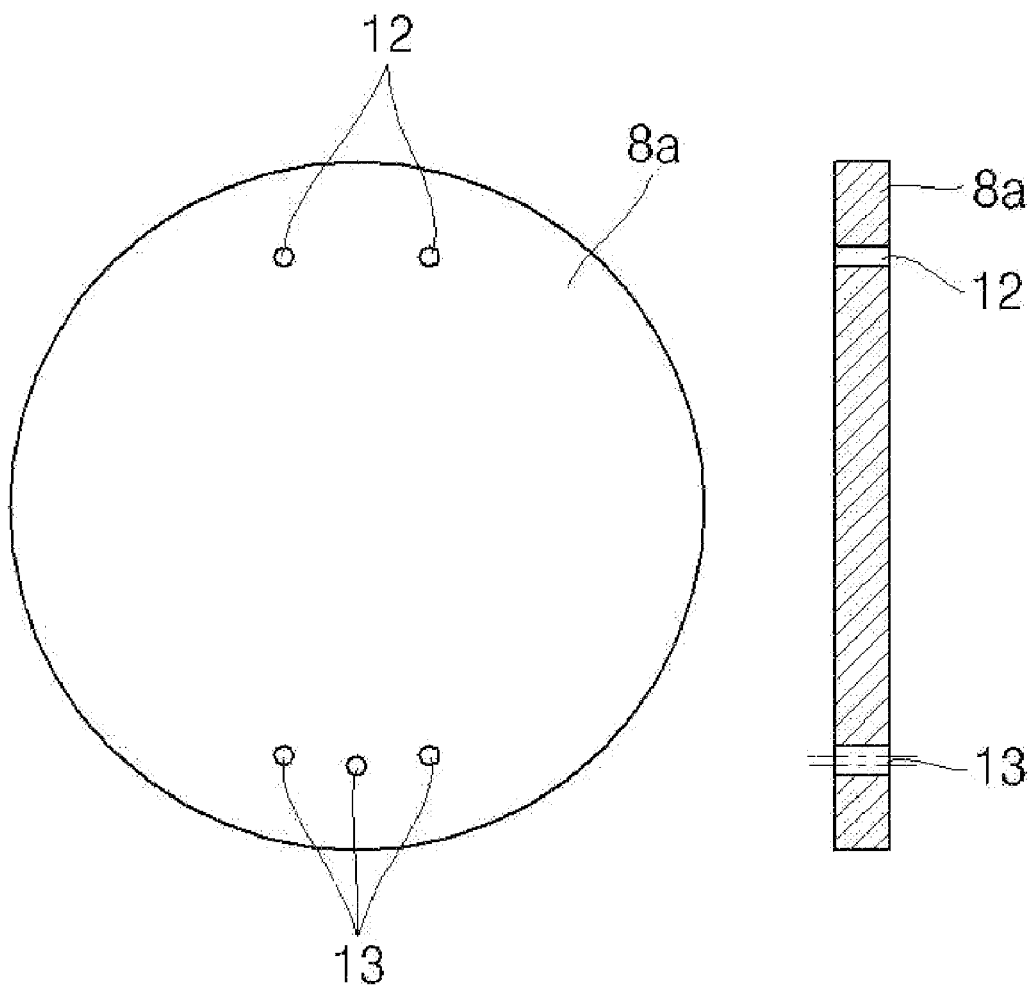
FIG. 4 illustrates a rear Pb-glass window of the underwater CCD camera according to the embodiment of the present invention.

FIG. 4 illustrates a rear Pb-glass window of the underwater CCD camera according to the embodiment of the present invention.

Referring to FIG. 4, the rear Pb-glass window 8b is formed at an upper side thereof with two vent holes 12 and at a lower side thereof with three vent holes 13.

With this configuration, the underwater CCD camera for the visual testing of the reactor cooling system according to the embodiment operates as follows.

The underwater CCD camera is filled with a coolant having a temperature of about 30-37° C. and is located in water of a spent fuel pool and a reactor in a radioactive environment to test for a damaged state and defects that can occur in the fuel assembly 100 and in the pressure container of the reactor.

In the case where the CCD camera 4 is operated in the coolant for testing, since heat is generated from the CCD camera 4, increasing the inner temperature of the casing 1 up to about 70° C., and possibly damaging the CCD circuit of the CCD camera 4, it is necessary to cool the interior of the casing 1 for normal operation of the CCD camera 4. Further, to prevent noise due to radiation exposure in the radioactive environment and to secure the quality of digital images, it is necessary to shield the CCD circuit of the CCD camera 4 from the radiation exposure.

Figure 5:
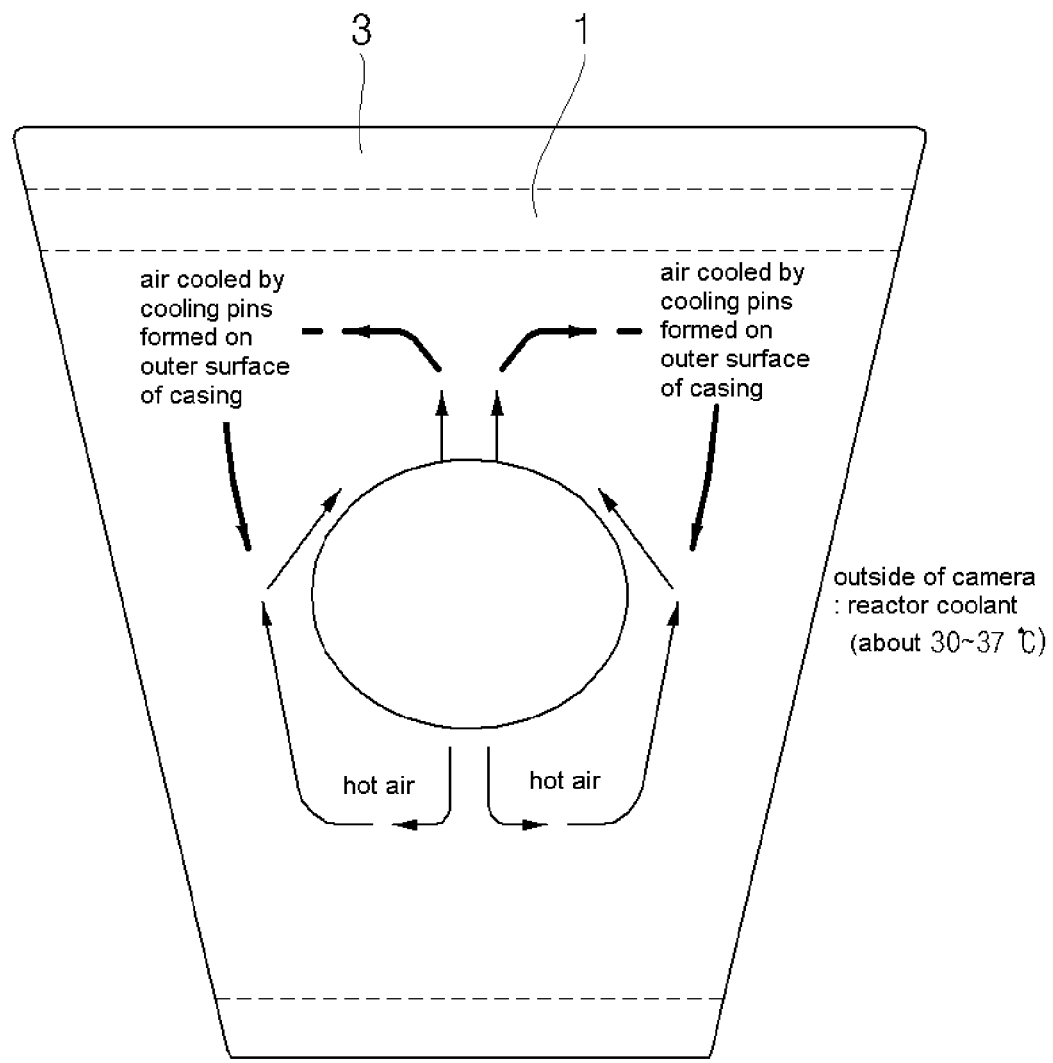
FIG. 5 illustrates air flow in a casing of underwater CCD camera according to the embodiment of the present invention.

In this embodiment, the top surface of the casing 1 has an area about two times greater than that of the bottom surface thereof (see FIG. 5), so that heat generated from the CCD camera 1 is naturally removed not only by a cooling operation of the cooling pins 3 formed on the top surface of the casing 1, but also by natural convection in the casing 1 by thermal gradient between upper and lower parts within the casing 1, thereby preventing an increase in inner temperature of the casing 1.

The front and rear Pb-glass windows 8a, 8b are dually installed on the front side of the CCD camera 4, so that the CCD circuit of the CCD camera 4 can be shielded from radiation exposure. Further, the rear Pb-glass window 8b is formed at the upper side thereof with the two vent holes 12, and at the lower side thereof with the three vent holes 13, so that interior air between the Pb-glass windows 8a and 8b can circulate in the easing 1 by the thermal gradient between the upper and lower parts inside the casing 1.

In addition, the silicon spacer 7 is interposed between the front Pb-glass window 8a and the rear Pb-glass window 8b on the front side of the CCD camera 4, so that thermal contraction and expansion can be absorbed by ductility of silicon, and temperature change of the rear Pb-glass window 8b contacting the sealing O-ring 5 can be minimized, thereby minimizing expansion of the sealing O-ring 5 due to the temperature change while enhancing a sealing effect.

As described above, in the underwater CCD camera for visual testing of a reactor cooling system according to the embodiment, the casing has a top surface, an area of which is two or more times greater than that of the bottom surface thereof to generate natural convection in the easing by thermal gradient between upper and lower parts inside the casing, thereby removing heat generated by the CCD camera through natural cooling, and the lead (Pb)-glass windows are dually disposed on the front side of the CCD camera, thereby protecting the CCD circuit of the CCD camera from radiation exposure. Further, the glass windows are formed with vent holes, so that interior air between the Pb-glass windows circulates in the casing through the vent holes.

Although some embodiments have been provided to illustrate the invention, it will be apparent to those skilled in the art that the embodiments are given by way of illustration, and that various modifications, additions, and substitutions can be made without departing from the spirit and scope of the invention. The scope of the invention should be limited only by the accompanying claims and equivalents thereof.

What is claimed is:

1. An underwater charge coupled device (CCD) camera for visual testing of a reactor cooling system, comprising:
a CCD camera;
a casing having a supporter therein to support the CCD camera and a cooling pin formed on a top surface of the casing;
a Pb-glass window installed on a front side of the casing to shield the CCD camera from radiation and to reduce temperature difference between interior and exterior of the casing;

a sealing O-ring preventing a coolant from being introduced into a gap between the Pb-glass window and the casing;

a sealing nut providing a fastening force to bring the Pb-glass window into close contact with the sealing O-ring such that the Pb-glass window is sealed by the sealing O-ring;

a rear cap disposed at the rear of the casing;

a silicon O-ring preventing the coolant from being introduced into a gap between the rear cap and the casing; and a fastening nut providing a fastening force to prevent leakage between a camera cable and the casing.

2. The underwater CCD camera according to claim 1, wherein the Pb-glass window comprises a front Pb-glass window and a rear Pb-glass window.

3. The underwater CCD camera according to claim 2, further comprising:

a silicon spacer interposed between the front Pb-glass window and the rear Pb-glass window.

4. The underwater CCD camera according to claim 2, wherein the rear Pb-glass window is formed at upper and lower sides thereof with vent holes.

5. The underwater CCD camera according to claim 4, wherein the vent holes comprise two vent holes formed at the upper side and three vent holes formed at the lower side.

6. The underwater CCD camera according to claim 3, further comprising:

washers between the sealing nut and the front Pb-glass window and between the silicon spacer and the rear Pb-glass window.

7. The underwater CCD camera according to claim 6, wherein the washers comprise Teflon washers.

* * * * *